United States Patent [19]

Nero

[11] Patent Number: 4,654,775

[45] Date of Patent: Mar. 31, 1987

[54] TRANSFORMER WINDING ARRANGEMENT FOR A TELEVISION APPARATUS

[75] Inventor: Leroy W. Nero, Indianapolis, Ind.

[73] Assignee: RCA Corporation, Princeton, N.J.

[21] Appl. No.: 717,805

[22] Filed: Mar. 29, 1985

[51] Int. Cl.[4] .......... H02M 7/00

[52] U.S. Cl. .......... 363/68; 336/170

[58] Field of Search .......... 323/355; 363/68, 69, 363/126; 336/145, 170, 173, 180, 182, 185

[56] References Cited

U.S. PATENT DOCUMENTS

| | | | |
|---|---|---|---|
| Re. 31,119 | 1/1983 | Mitani et al. | 363/68 X |
| 2,878,455 | 3/1959 | Lamberton et al. | 336/180 X |
| 2,910,529 | 10/1959 | Splitt | 336/180 X |
| 3,652,968 | 3/1972 | Johnston et al. | 336/170 |
| 3,886,434 | 5/1975 | Schreiner | 363/68 |
| 3,947,749 | 3/1976 | Kimura et al. | 363/126 |
| 4,086,552 | 4/1978 | Baggermans | 336/119 |
| 4,204,263 | 5/1980 | Onoue | 363/68 |
| 4,227,143 | 10/1980 | Elders et al. | 336/180 X |
| 4,247,889 | 1/1981 | Riechmann | 363/126 |

*Primary Examiner*—Patrick R. Salce
*Assistant Examiner*—Marc S. Hoff
*Attorney, Agent, or Firm*—Paul J. Rasmussen; Joseph Laks; Scott J. Stevens

[57] ABSTRACT

A high voltage transformer incorporates a bobbin on which the primary winding is wound. The transformer auxiliary coils are wound directly over the primary winding with no intermediate layers of insulation. The wire turns of the auxiliary coils are evenly distributed over the full traverse of the primary winding to improve magnetic coupling and simplify tuning of the transformer.

3 Claims, 4 Drawing Figures

TRANSFORMER WINDING ARRANGEMENT FOR A TELEVISION APPARATUS

This invention relates to winding of transformer coils and, in particular, to winding techniques for transformers having high voltage stresses.

A high voltage transformer for a video display apparatus, such as a television receiver or a computer monitor, normally comprises one or more primary or auxiliary coils wound on a bobbin or coil form. A second bobbin surrounds the primary winding bobbin and receives the tertiary windings which produce the high voltage or anode potential for a cathode ray tube.

During operation of the transformer, voltage potentials are generated across each of the windings on the primary winding bobbin. The difference between the voltage potentials across different windings creates voltage stressed between the windings so that insulating material, such as Mylar polyester film, is required to be placed between winding layers on the bobbin. The placement of the individual turns of the auxiliary coils with respect to the primary winding may result in localized voltage stresses between the windings that are undesirably high, particularly when the auxiliary windings are heavily loaded, such as when the high voltage transformer is used with a resonant retrace deflection circuit. Additionally, loading of the primary winding by the auxiliary windings affects the loading of the tertiary winding by the primary winding which in turn may influence the harmonic tuning of the transformer. Tuning of the transformer can influence the high voltage level and the high voltage circuit output impedance. If the spatial relationship of the windings is not carefully controlled, additional transformer tuning components may be required to obtain the desired operating characteristics for the transformer.

In accordance with an aspect of the present invention, a high voltage transformer for a video display apparatus comprises a tertiary coil form having a tertiary winding wound on the coil form. A magnetically permeable core is disposed within the tertiary coil form. A primary winding assembly is disposed between the tertiary coil form and the core and comprises a coil form with a primary winding wound on the coil form. The primary winding occupies a predetermined winding region. At least one additional winding overlaps the primary winding and comprises a plurality of winding turns evenly distributed over the predetermined winding region.

In the accompanying drawing, FIG. 1 is a schematic and block diagram of a portion of a video display apparatus;

Figure 1:
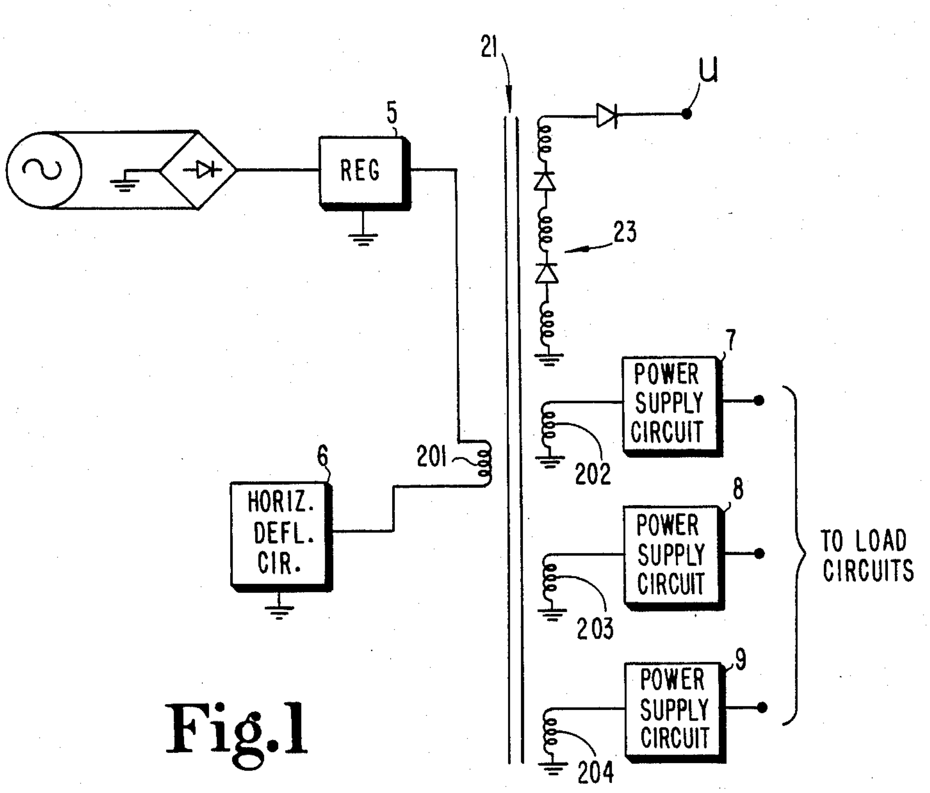

FIG. 1 illustrates a portion of a video display apparatus in which an unregulated DC voltage is applied to regulator circuit 5, which may illustratively be of an SCR type or a switching-type regulator, to produce a regulated B+ voltage that is applied to one terminal of a high voltage transformer primary winding 201. The other terminal of primary winding 201 is coupled to a horizontal deflection circuit 6 which may illustratively be of the resonant retrace type. High voltage transformer 21 produces, via high voltage or tertiary winding 23, a high voltage level at a terminal U, which is applied to the ultor or anode terminal of a cathode ray tube (not shown). Transformer 21 is illustratively of the type that produces a plurality of supply voltages for some of the other load circuits (not shown) of the video display apparatus. Transformer windings 202, 203 and 204, along with power supply circuits 7, 8 and 9, respectively, generate the desired voltage levels for their associated load circuits. The construction of transformer 21 will be explained in greater detail later in conjunction with the description of FIG. 3.

Figure 2:
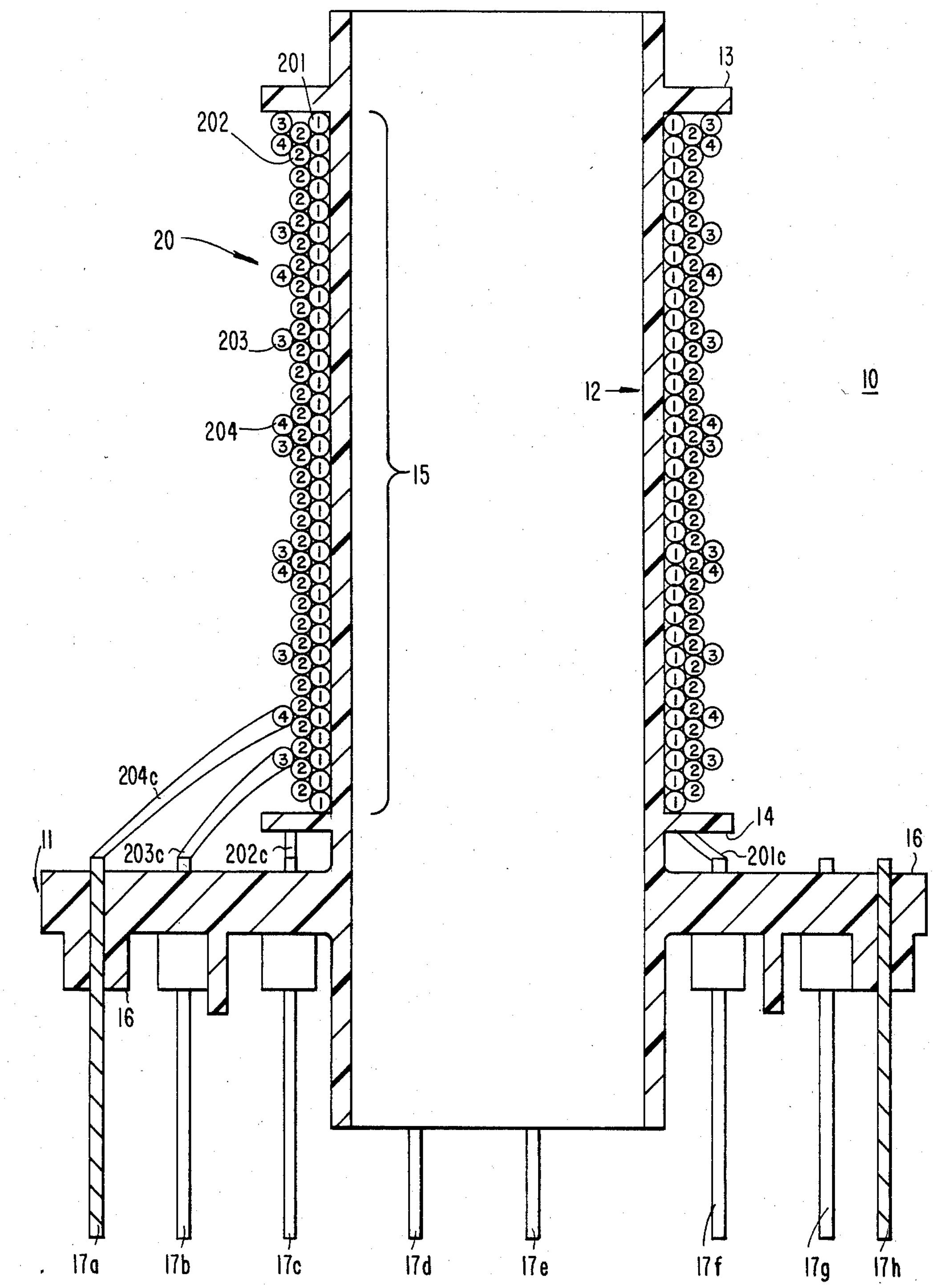
FIG. 2 is a cross-sectional view of a transformer bobbin and coil assembly constructed in accordance with the present invention.

FIG. 2 shows a transformer winding coil form or bobbin 10, illustratively made of a plastic material, such as plastics sold under the names of Noryl or Valox. Bobbin or coil form 10 comprises a base 11 and a cylindrical body 12 about which the transformer windings are wound. Bobbin 10 also incorporates an upper winding stop 13 and a lower winding stop 14 which contain the transformer windings within a winding region 15. Base 11 incorporates a plurality of radial elements 16, each of which illustratively incorporates an electrical terminal, designated **17*a*–17*h*. The interior of bobbin 10** is shaped to receive a magnetically permeable core (not shown).

A plurality of transformer windings 20 are shown wound on bobbin 10. Each winding will comprise a plurality of wire turns having two terminals for coupling the winding to a load circuit. One terminal is coupled to respective ones of bobbin terminals **17*a*–17*h*. The wire turns that comprise each of the windings on bobbin 10 are shown in an exaggerated manner for illustrative purposes. The actual number of turns in each winding is determined using conventional transformer design criteria. Each of the transformer windings 20 is wound in layer fashion within winding region 15 on bobbin 10. The individual windings may each comprise one or more layers of wire turns, but in the assembly shown in FIG. 1, each winding is illustratively comprised of only one layer of wire turns for simplicity. Additional windings may also be wound on bobbin 10**.

Figure 3:
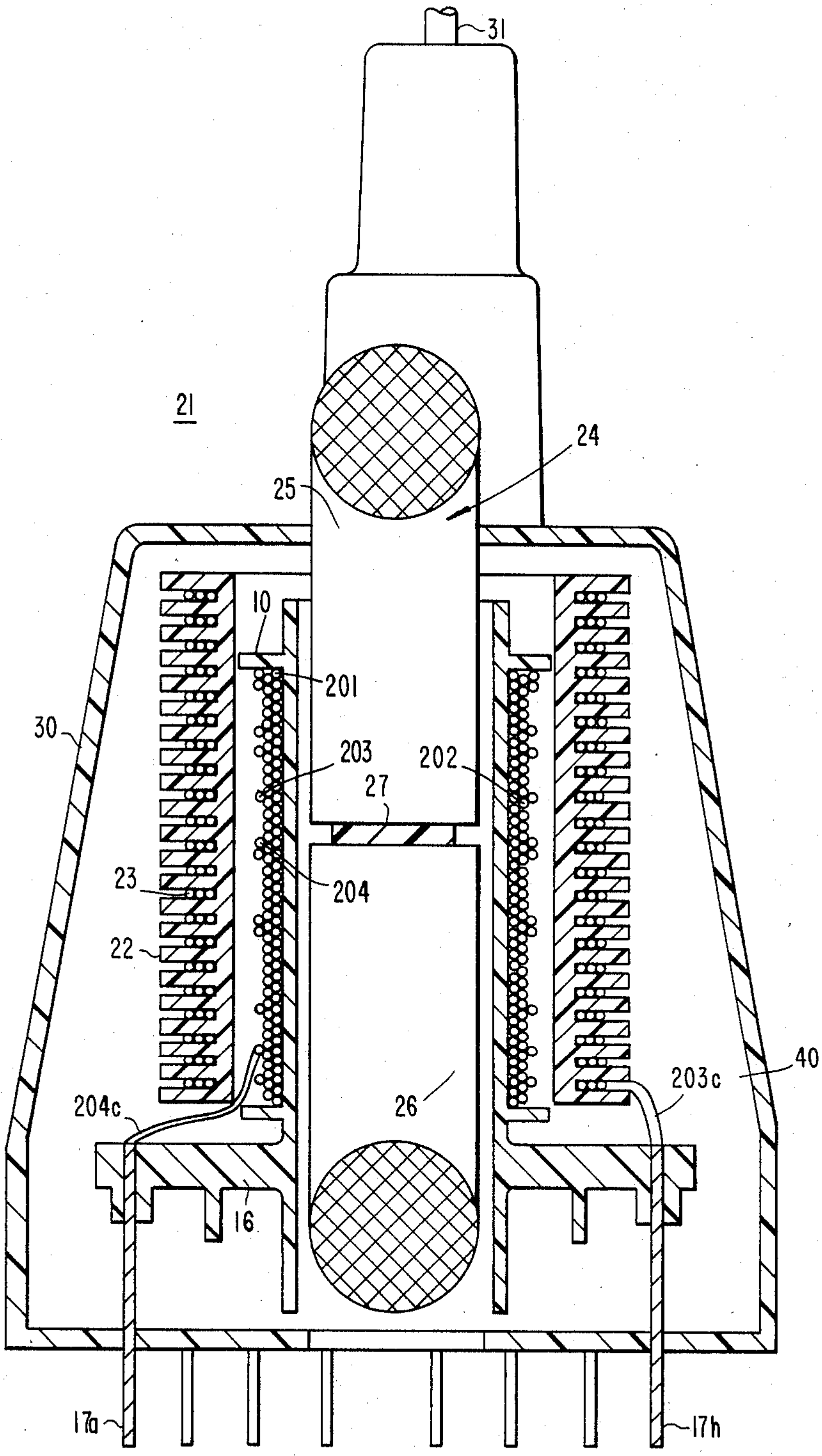
FIG. 3 is a cross-sectional view of a high voltage transformer constructed in accordance with the present invention.

The wire turns that are designated in FIG. 2 by the identifying numeral "1" comprise the wire turns of primary winding 201. The wire turns that are designated in FIG. 2 by the identifying numerals "2", "3" and "4" comprises the wire turns of auxiliary windings 202, 203 and 204, respectively. Windings 201, 202, 203 and 204 are respectively connected to terminals **17*f*, 17*c*, 17*b* and 17*a* via conductors 201*c*, 202*c*, 203*c* and 204*C*. In accordance with a feature of the present invention, primary winding 201 and auxiliary windings 202, 203 and 204 are uniformly distributed over the winding region 25, such that the spacing between individual wire turns is substantially constant for a given winding. In FIG. 2, each of windings 202, 203 and 204 extend over the complete traverse (i.e., winding region 15) of the primary winding 201. This permits a uniform or constant degree of magnetic coupling between each of windings 202, 203 and 204 and primary winding 201 over the entire length of the windings. This causes the primary winding 201 to be uniformly loaded by each of windings 202, 203 and 204. When bobbin 10** comprises a portion of a television receiver or video monitor high voltage transformer, as shown in FIG. 3, uniform loading of the primary winding by the auxiliary windings results in uniform loading of the tertiary or high voltage winding by the primary winding, since energization of the auxiliary windings load the primary winding which is reflected to the tertiary winding. A constant network resonance from the primary winding to each coil of the transformer tertiary winding is maintained, which advantageously permits the tuning of the tertiary winding to a single harmonic pole, which may illustratively be a high harmonic of the order of the ninth harmonic or above.

Figure 4:
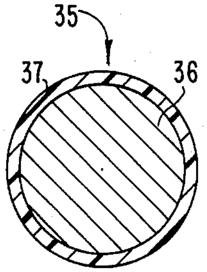
FIG. 4 is a cross-sectional view of a wire such as that used to wind the transformer windings shown in FIG. 3.

In accordance with another feature of the present invention, each of the windings 202, 203 and 204 overlay the previous windings directly, without the placement of any insulating material between the winding layers. FIG. 4 illustrates a typical insulated wire 35, which may be used to wind any of windings 201, 202, 203 or 204. Wire 35 comprises a conductive wire core 36 surrounded by an insulating jacket 37. Because of the high AC voltage stress between wire turns of different windings, it is important that the thickness and electrical property requirements of insulation 37 be carefully determined. Using wire that has more insulation than is necessary increases the size and cost of the transformer, and may degrade coupling between windings. Too little insulation increases the chance of arcing and transformer failure.

An analysis of the wire insulation on a molecular level yields information with respect to voltage stress tolerance and time to insulation failure. The coupling energy between molecules of a material is a function of the material composition and the process used in its formation. There can be one or more coupling poles between molecules, each containing a discrete amount of coupling energy. The molecules of the wire insulation have all of their coupling poles coupled, making for very high resistance.

There are stresses, however, that are placed upon the molecular bonds of the insulator during each period of AC field change. These stresses reduce the coupling energy during each stress cycle. The greater the voltage stress, the greater amount of coupling energy lost during each AC cycle. This eventually causes the coupling bond on the molecules to break. At this time the molecules become sources, as in a conductor, being able to pass electric current continuously at some resistance level. An analysis of this voltage stress-induced bond breakdown reaction for transformer wire insulation yields the relationship:

$$t_f = \frac{K}{(s)\,(e^{5.4366})\,(T^{29.5562})}$$

where

- $t_f$ is the insulation time to failure in hours;
- K is a constant determined from insulation property data supplied by the wire manufacturer;
- s is a function of the AC voltage waveform, that for a waveform having an unbalanced duty cycle, such as the flyback pulse voltage, is substantially equal to unity;
- e is the applied voltage value in Vrms/mil; and
- T is the operating temperature in Kelvin.

Using the previously described analysis, it is possible to determine, for a given wire gauge, the optimum wire insulation characteristics, such as thickness and type of material necessary to insure reliable transformer operation. By using the analysis, it is possible to wind the transformer windings without the placement of insulating sheets, such as Mylar polyester film, between the individual winding layers, while maintaining reliable operation without significant risk of transformer failure. The omission of the insulation between layers of windings improves magnetic coupling between windings which improves power transfer and load circuit output impedance characteristics.

In accordance with a feature of the present invention, transformer 21 embodying the previously described winding techniques is shown in FIG. 3. Transformer 21 comprises bobbin 10 having windings 201, 202, 203 and 204 wound thereon. Surrounding bobbin 10 is a tertiary winding bobbin 22, upon which is wound the high voltage tertiary winding 23. A magnetically permeable core 24, comprising upper and lower core segments 25 and 26, with an intermediate core spacer 27, is disposed within the interior of bobbin 10. The winding assemblies are disposed within a transformer housing 30 and are desirably potted within housing 30 with an epoxy compound 40. A high voltage or anode lead 31 is coupled to the high voltage end of tertiary winding 23 and supplies the high voltage level to the anode terminal of a cathode ray tube (not shown).

The previously described transformer therefore incorporates advantageous winding techniques in which subsequent winding layers on the primary winding bobbin are wound directly over previous layers without intermediate layers of insulation which optimizes power transfer and output impedance characteristics. The winding turns of the auxiliary coils are distributed evenly over the full traverse of the primary winding which permits tuning of the transformer to a single harmonic, for example a high harmonic such as the ninth harmonic. These techniques therefore simplify tuning of the transformer, providing a reliable assembly, and aids in reducing the size and cost of the transformer.

What is claimed is:

1. A high voltage transformer for a video display apparatus comprising:
   - a transformer housing;
   - a tertiary coil form disposed within said housing and having a tertiary winding wound thereon;
   - a magnetically permeable core disposed within the interior of said tertiary coil form;
   - a primary winding assembly disposed between said tertiary coil form and said core, comprising:
   - a coil form;
   - a primary winding wound on said coil form over a predetermined winding region; and
   - at least one additional winding wound on said coil form and overlaying said primary winding, said additional winding comprising a plurality of winding turns evenly distributed over said predetermined winding region, such that said additional winding is substantially uniformly magnetically coupled to said primary winding over said predetermined winding region, said additional winding being wound directly over said primary winding without an intermediate layer of insulation between said primary winding and said additional winding.

2. A high voltage transformer for a video display apparatus comprising:
   - a transformer housing;
   - a tertiary coil form disposed within said housing and having a tertiary winding wound thereon;
   - a magnetically permeable core disposed within the interior of said tertiary coil form;

a primary winding assembly disposed between said tertiary coil form and said core, comprising:

a coil form;

a primary winding wound on said coil form over a predetermined winding region; and at least one additional winding wound on said coil form and overlaying said primary winding, said additional winding comprising a plurality of winding turns evenly distributed over said predetermined winding region, such that said additional winding is substantially uniformly magnetically coupled to said primary winding over said predetermined winding region, said additional winding being energized to provide power to a load circuit, said load circuit heavily loading said additional winding, whereby said even distribution of said additional winding prevents degradation of the harmonic tuning of said high voltage transformer due to said heavy loading of said additional winding, said additional winding being wound directly over said primary winding without an intermediate layer of insulation between said primary winding and said additional winding.

3. A high voltage transformer for a video display apparatus comprising:

a transformer housing;

a tertiary coil form disposed within said housing and having a tertiary winding wound thereon;

a magnetically permeabl e core disposed within the interior of said tertiary coil form;

a primary winding assembly disposed between said tertiary coil form and said core, comprising:

a coil form;

a primary winding wound on said coil form over a predetermined winding region;

a first additional winding wound on said coil form and overlaying said primary winding, said additional winding comprising a plurality of winding turns evenly distributed over said predetermined winding region, such that said additional winding is substantially uniformly magnetically coupled to said primary winding over said predetermined winding region; and a second additional winding having a plurality of winding turns interleaved with the winding turns of said first additional winding, said winding turns of said first additional winding and said second additional winding being evely distributed independent of the other of said additional windings.

* * * * *